(12) United States Patent
Nusbaum

(10) Patent No.: US 6,575,344 B2
(45) Date of Patent: *Jun. 10, 2003

(54) UNIVERSAL BICYCLE RACK USING A SEAT POST CLAMP

(75) Inventor: Neil Nusbaum, Culver City, CA (US)

(73) Assignee: Hollywood Engineering, Inc., Compton, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,566

(22) Filed: Aug. 19, 1999

(65) Prior Publication Data

US 2002/0005422 A1 Jan. 17, 2002

Related U.S. Application Data

(60) Provisional application No. 60/097,514, filed on Aug. 21, 1998.

(51) Int. Cl.[7] .................................................. B60R 9/00
(52) U.S. Cl. ........................ 224/525; 224/533; 224/536; 224/537; 224/924
(58) Field of Search ................................ 224/525, 533, 224/536, 537, 522, 523, 924, 534, 532

(56) References Cited

U.S. PATENT DOCUMENTS

| 5,529,231 A | | 6/1996 | Burgess | |
|---|---|---|---|---|
| 5,690,259 A | * | 11/1997 | Montani | 224/924 X |
| 5,794,828 A | * | 8/1998 | Colan et al. | 224/533 X |
| 5,996,870 A | * | 12/1999 | Shaver | 224/532 |
| 6,006,973 A | * | 12/1999 | Belinky et al. | 224/525 X |
| 6,019,266 A | * | 2/2000 | Johnson | 224/924 X |

FOREIGN PATENT DOCUMENTS

FR    2642024    *  7/1990    ................. 224/924

* cited by examiner

Primary Examiner—Stephen K. Cronin
Assistant Examiner—Maerena W. Brevard
(74) Attorney, Agent, or Firm—Snell & Wilmer LLP

(57) ABSTRACT

A bicycle rack for supporting a bicycle has an attachment mount member configured for coupling to a transport vehicle. A support assembly is connected to the attachment mount member and is configured to hold a wheel of the bicycle. A vertical support beam is connected at a first end to the support assembly. When the bicycle rack is used to transport a bicycle, the vertical support beam is stationary relative to the support assembly. A seat anchoring assembly is attached at a second end of the vertical support beam and is configured to hold a portion of a set of the bicycle.

23 Claims, 3 Drawing Sheets

UNIVERSAL BICYCLE RACK USING A SEAT POST CLAMP

CROSS REFERENCE TO RELATED APPLICATIONS

This application claims the benefit of U.S. Provisional Application No. 60/097,514, filed Aug. 21, 1998. This application is a continuation of U.S. patent application Ser. No. 09/378,566, filed Aug. 19, 1999.

FIELD OF INVENTION

The present disclosure describes a universal bicycle rack that universally holds all different kinds of bicycles. More specifically, the present disclosure teaches a bicycle rack that is configured to hold a portion of a seat of said bicycle.

BACKGROUND OF THE INVENTION

Bicycle racks that attach to the rear of a vehicle are known. One such system, which attaches to a trailer hitch, is described in U.S. Pat. No. 5,529,231. This system mounts to the trailer hitch of the automobile. Most of these prior art bicycle racks are either hitch-mounted to or strapped onto the vehicle using either a support beam or support arms.

Certain prior art bicycle racks include arms to hold a bicycle. Tubes that form the bicycle frame typically rest on the arms of the rack.

These bicycle racks work well with traditional bicycle frames. However some new bicycles, often called "full suspension" bicycles, may not have the same main tube frames as traditional bicycles. Some bicycles may have no frames at all.

Accordingly, conventional bicycle carriers do not work well with bicycles that have non-traditional frames.

SUMMARY

The present system defines a bicycle carrier that does not rely on traditional bicycle frames for holding the bicycle and instead holds the bicycle by elements that are common to all bicycles, including non-frame bicycles.

According to this aspect, one such element common to almost all bicycles is the seat post. Although the post diameter and angle may vary, the post is generally cylindrical and its location in relation to the bicycle's overall geometry is consistent.

Another consistent point is the bicycle wheels. Hence, one embodiment of this invention uses the bicycle seat post and wheels to hold the bicycle on the carrier.

BRIEF DESCRIPTION OF THE DRAWINGS

These and other aspects of the invention will now be described with reference to the attached drawings, in which.

DESCRIPTION OF THE PREFERRED EMBODIMENTS

Figure 1:
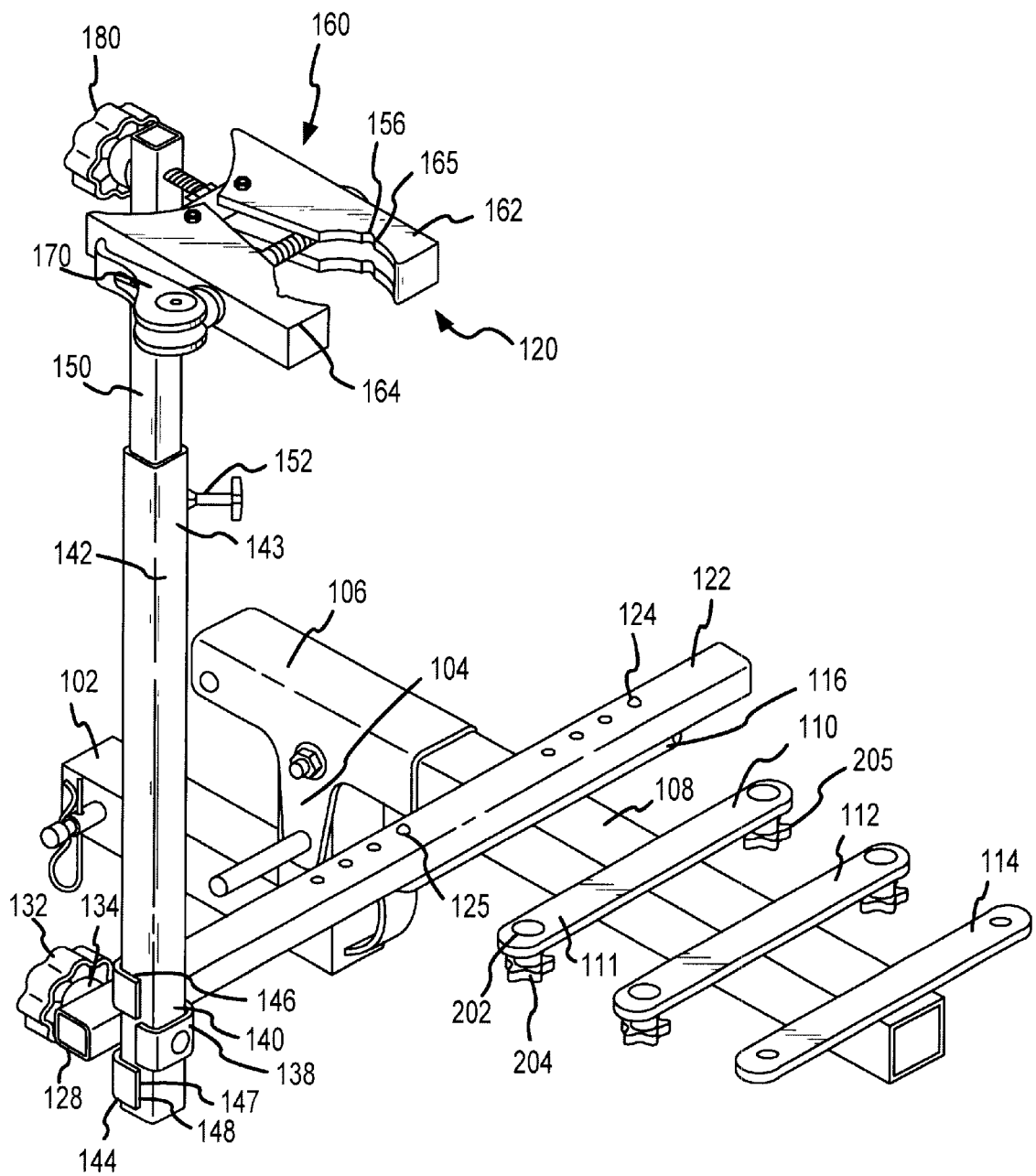
FIG. 1 shows a bicycle rack in accordance with one embodiment of the invention.

A bicycle rack according to one embodiment of the invention is shown in FIG. 1. The embodiment shown in FIG. 1 includes an automobile attachment portion 102 which is adapted to insert into the trailer hitch of an automobile or truck or the like. It will be appreciated that any other attachment to the vehicle is possible, preferably attachment to the rear of the vehicle. The automobile attachment portion 102 is connected to an upward extending element 104, which itself is connected to a support bracket 106. Support bracket 106 supports a main transverse support beam 108, which is substantially parallel to the automobile attachment portion 102, but spaced upward therefrom.

The main support beam 108 supports bicycle mount devices 110, 112, 114, 116, each of which may be identical. A seat mount assembly 120 is shown mounted on bicycle mount device 116.

A seat mount support beam 122 is screwed onto bicycle mount device 116 using screws 124, 125, near a first end 123 of seat moved support beam 122. A second end 128 is connected to a tightenable clamp 130 which allows selectively tightening and loosening pressure between a first surface 134 and a second surface 138 of clamp 130. Second surface 138 includes an inner surface 140 which is substantially of the same shape as the outer surface of an upwardly extending part 142. Similarly, fixed portions 144, 146 of the clamp are attached to the seat mount support beam 122, and include an inner surface 147 that is substantially the same shape as the outer surface of upwardly extending part 142.

In operation, the clamp 130 can be tightened and loosened. When tightened, the clamp is in the position shown in FIG. 1. The upwardly extending part 142 is rigidly held between the second surface 138 and fixed portions 144, 146 with the two fixed portions 144, 146 on one side of the upwardly extending part 142, and the movable second surface 138 on the other side. Hence, the part 142 cannot move.

The clamp 130 can be loosened to allow the second surface 138 to be retracted from the fixed portions 144, 146. When moved sufficiently far away, the upwardly extending part 142 can be similarly moved away and can move beyond the outer edge surfaces 148 of the fixed portions 144, 146 of the clamp 130. This allows the upwardly extending part 142 to rotate relative to clamp 130 so that it can be folded down to a position where it is parallel and coplanar with the seat mount support beam 122. In this folded down and out of the way position, the part 142 will not interfere with access to the rear of the vehicle, such as a hatchback or the like. Upwardly extending part 142 preferably includes a hollow piece 143 with a second upwardly extending piece 150 located inside the hollow piece 143.

Seat mount assembly 120 also includes a seat clamp 160. The overall height where the seat clamp 160 is located can be adjusted by changing the amount of second upwardly extending piece 150 which extends from the hollow piece 143. The height of the seat clamp 160 can be raised or lowered in this way to accommodate any height of bicycle. Moreover, since the overall height changes, the length of the upwardly extending part 142 is actually changed. Accordingly, when part 142 is shortened, there is less of the part 142 that could otherwise be inconveniently located when folded down for storing.

A clamping mechanism 152 in this embodiment includes a screw which is screwed into the outer hollow piece 143 and provides friction against the second upwardly extending piece 150.

A more preferable system uses a clamp which attaches to both the pieces 143 and 150. However, any clamp which holds piece 150 relative to piece 143 can be used to adjust this height.

Figure 3:
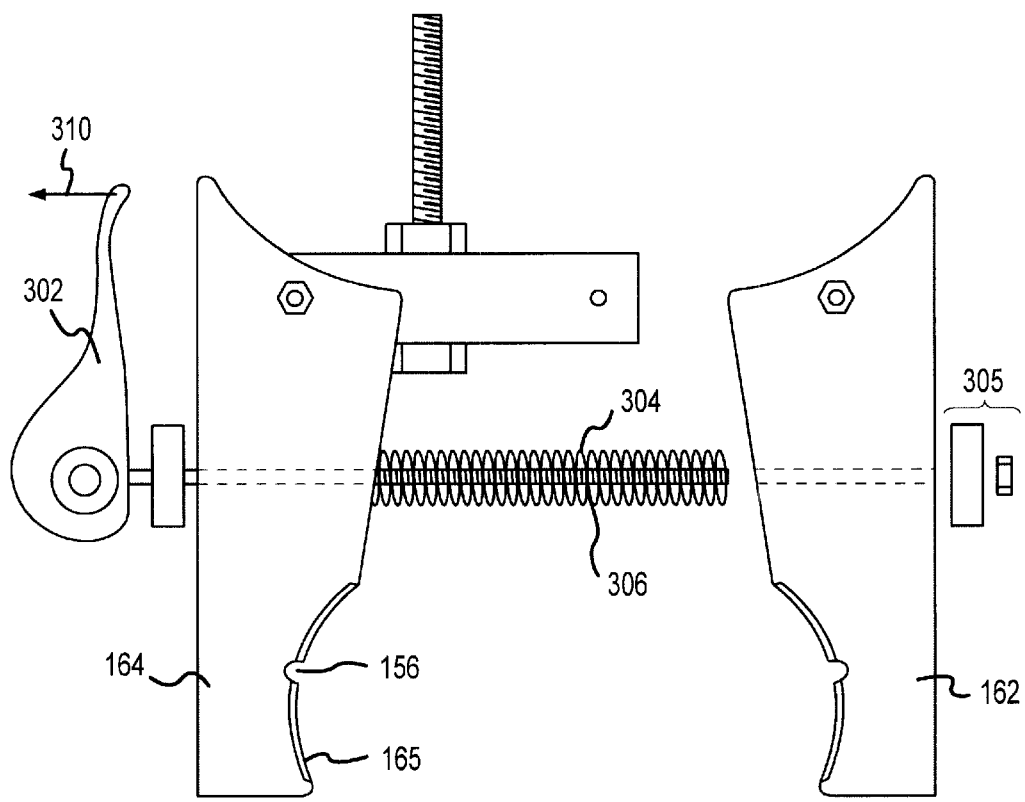
FIG. 3 is an exploded view of a seat post clamp in accordance with another embodiment of the invention.

The seat clamp 160 is shown in further exploded detail in FIG. 3. Seat clamp 160 can be made to hold any part of the bicycle seat. In one embodiment of the invention, the seat clamp holds the seat post.

The seat clamp 160 includes first and second clamping jaws 162 and 164 which can be extended away from each other and contracted closer to each other to hold the seat post. In the open position shown in FIG. 1, the two jaws 162, 164 are wide open, and the bicycle seat post can be positioned between the two jaws. Note that inner surfaces 165 of each of the jaws 162, 164 are substantially arcuate to hold a typical bicycle seat post. Each inner surface also includes a notched portion 156 facilitating holding a seat post which is other than cylindrical in shape.

Once the seat post is inserted between the jaws 162, 164, the jaws are contracted to bring the surfaces 165 closer to one another. The jaws are contracted until inner surfaces 165 fit snugly around the seat post.

One technique of contracting the jaws is by using an over-the-center cam lever 170, as shown in FIG. 1. Referring to FIG. 3, the over-the-center cam lever includes a cam handle 302 connected to a lead screw 304, a spring 306 and a nut assembly 308. The lead screw 304 threads into the nut assembly 308. Hence, when the cam handle 302 is rotated in a rotation perpendicular to the plane of the paper in FIG. 3, it causes the jaws 162, 164 to come closer to one another. When they reach a desired position, the cam is then rotated in the direction of arrow 310 to put even further force holding the jaws 162, 164 against one another. The clamp 160 stays locked in that rotated position until it is unlocked by rotating cam handle 302 in opposite of the direction shown in arrow 310.

The position of the seat clamp 160 can also be adjusted in many different ways. A clamping mechanism 180 holds the seat post clamp 160 in a desired orientation relative to a horizontal plane. While the device in FIG. 1 shows the seat post clamp 160 as being horizontal, it can be tilted relative to the horizontal by clamp 180.

The height of the clamp can also be adjusted, as previously described, by raising or lowering second upwardly extending piece 150 relative to hollow piece 143.

In operation, the bicycle seat post is clamped within the jaws 162, 164. This holds the top portion of the bicycle. The bottom portion of the bicycle is held by a wheel holding assembly 200, as illustrated in FIG. 2.

Figures 2, 2A:
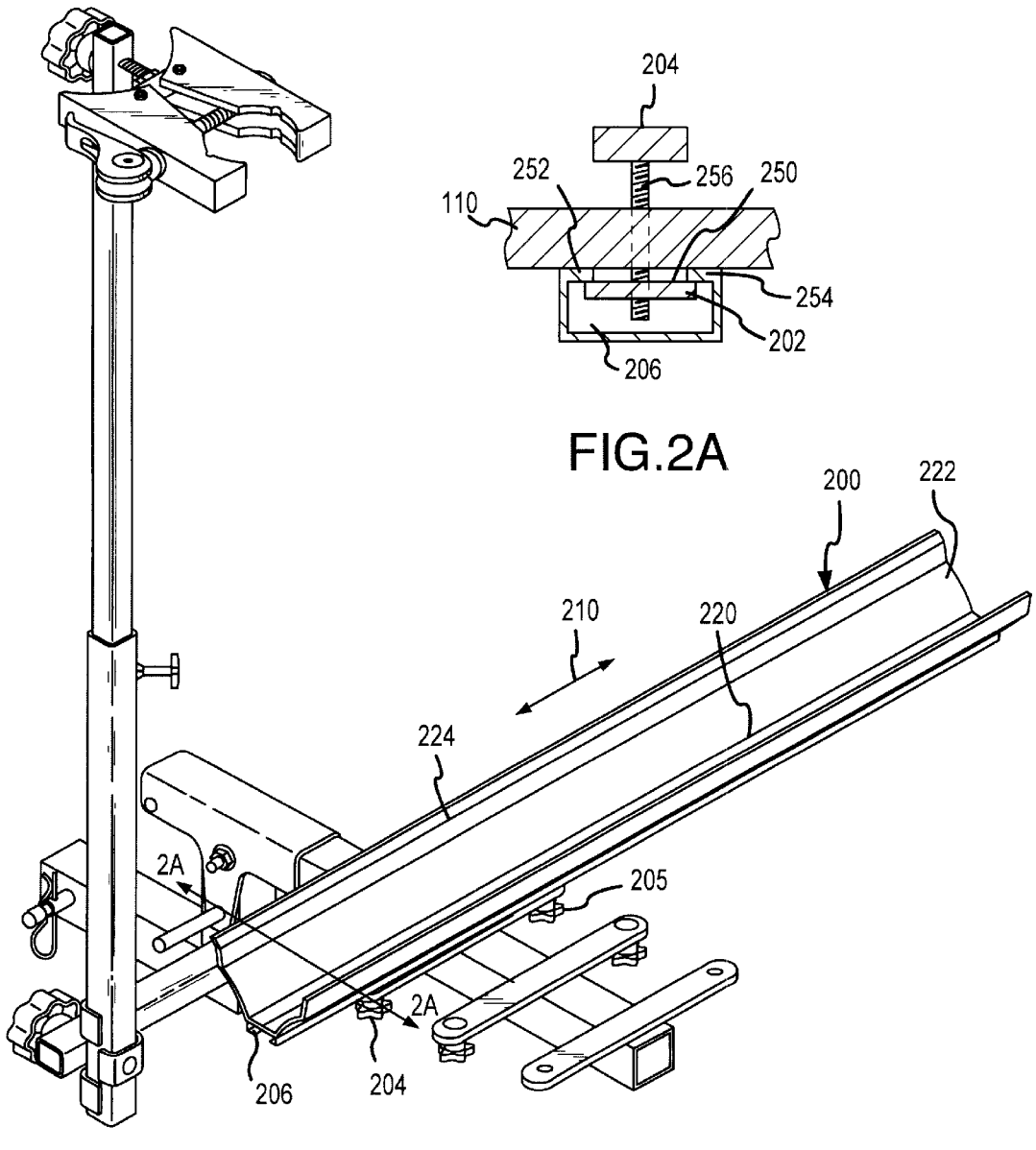
FIG. 2 shows a bicycle rack in accordance with another embodiment of the invention.
FIG. 2A is a cross-sectional view of a portion of a wheel holding assembly.

Referring to FIGS. 1, 2 and 2A, a wheel holding assembly 200 is screwed onto the bicycle mount device 110. The wheel holding assembly is held on disc shaped portions 202 which are located at the top of screwable devices 204, 205. The devices 204, 205 can be tightened or loosened to allow more slack between a top surface 111 of bicycle mount device 110 and the disc shaped portion 202.

The outer diameter of disk shaped portion 202 fits within a holding channel 206. FIG. 2A is a cross-sectional view across the line 2A—2A which shows holding channel 206 as substantially u-shaped. The disk shaped portion 202 is held within the channel 206, with a bottom surface 250 of disk shaped element 202 being pressed against two flange portions 252 and 254 of the channel 206. The screwable device 204 having an integral lead screw 256 is also shown. The screwable device 204 can be tightened in order to hold the wheel holding assembly 200 firmly into place relative to the bicycle mount device 110. However, when the screwable devices 204 and 205 are loosened, the corresponding disk shaped portions 202 become loose within the channel 206. This allows the wheel holding assembly 200 to be slid in the direction shown by arrow 210 in FIG. 2. Hence, while the orientation of the wheel rack is maintained, the position of the wheel rack can be changed to accommodate any relative positioning between the bicycle seat post and the bicycle wheel.

Note that the additional two bicycle mount devices 112, 114 enable placing a second bicycle rack holding device on the same main transverse support beam 108. This allows using a second seat mount assembly for example on support element 114, and a second wheel holding assembly 200, e.g., on support rack 112. Any additional number of support devices could also be accommodated.

As shown in FIG. 2, the wheel holding assembly 200 generally includes an inner wheel resting part 220 which is substantially flat, sloped sections 222, both extending up from the wheel resting part 220 and flanged outer edges 224. A bottom portion of the wheel resting part 220 includes channel 206 which has been previously discussed.

Although only a few embodiments have been described in detail above, other embodiments are contemplated by the inventor and are intended to be encompassed within the following claims. In addition, other modifications are contemplated and are also intended to be covered.

What is claimed is:

1. A bicycle rack for transporting a bicycle in a horizontal position, said bicycle rack comprising:
    an attachment mount member configured for coupling to a transport vehicle;
    a support assembly connected to said attachment mount member and configured to hold a wheel of said bicycle, said support assembly comprising:
        a main support beam connected to said attachment mount member; and
        an extension beam connected substantially transversely to said main support beam;
    a seat anchoring assembly configured to hold a portion of a seat of said bicycle;
    an upwardly extending member connected at a first end to said seat anchoring assembly and connected at a second end to said support assembly by a rigid attachment mechanism, wherein, when said bicycle rack is used to transport said bicycle in a horizontal position, said rigid attachment mechanism resists movement of said upwardly extending member; and
    a first bicycle mount device connected substantially transversely to said main support beam and configured to support said extension bear.

2. The bicycle rack of claim 1, wherein said upwardly extending member comprises an inner telescoping member and an outer telescoping member configured to receive said inner telescoping member and wherein said inner telescoping member can be adjusted within said outer telescoping member so that the length of said upwardly extending member can be adjusted.

3. The bicycle rack of claim 1, wherein said support assembly further comprises:
    a wheel holding assembly connected substantially transversely to said main support beam and configured to hold a wheel of a bicycle, and
    wherein said upwardly extending member is attached at said second end to said extension beam when said bicycle rack is used to transport said bicycle.

4. The bicycle rack of claim 1, further comprising a second bicycle mount device connected substantially transversely to said main support beam and configured to support said wheel holding assembly.

5. The bicycle rack of claim 1, wherein said upwardly extending member is pivotally attached to said support assembly and is configured to be movable between a first vertical position for holding said bicycle and a second horizontal position for being stored when not in use.

6. The bicycle rack of claim 3, wherein said upwardly extending member is pivotally attached to said extension beam and is configured to be movable between a first vertical position for holding said bicycle and a second horizontal position for being stored when not in use.

7. The bicycle rack of claim 1, wherein said seat anchoring assembly includes a closable jaws assembly which comprises a first jaw member and a second jaw member, and wherein said first and second jaw members can be moved relative to each other.

8. The bicycle rack of claim 7, wherein said closable jaws assembly is rotationally mounted to said upwardly extending member.

9. The bicycle rack of claim 3, wherein said wheel holding assembly is slidably connected to said main support beam.

10. The bicycle rack of claim 1, wherein said wheel holding assembly is slidably connected to said second bicycle mount device.

11. The bicycle rack of claim 1, wherein said bicycle rack is configured to hold more than one bicycle.

12. The bicycle rack of claim 1 wherein said seat anchoring assembly is configured to hold the seat post of a bicycle.

13. A bicycle rack for supporting a bicycle in a horizontal position comprising:

an attachment mount portion;

an upwardly extending member connected at a first end to said attachment mount portion by a rigid attachment mechanism and configured to hold a portion of a seat of a bicycle wherein, when said bicycle rack is used to support said bicycle in a horizontal position, said rigid attachment mechanism resists movement of said upwardly extending member;

wherein said attachment mount portion comprises:

an attachment mount member configured for coupling to a transport vehicle; and a support assembly connected at a first part to said attachment mount member and connected at a second part to said upwardly extending member, said support assembly comprising:

a main support beam connected to said attachment mount member; and an extension beam connected substantially transversely to said main support; and a first bicycle mount device connected substantially transversely to said main support beam and configured to support said extension beam.

14. The bicycle rack of claim 13 further comprising a seat anchoring assembly attached to a second end of said upwardly extending member and configured to hold a portion of a seat of said bicycle.

15. The bicycle rack of claim 13, further comprising a wheel holding assembly connected to said attachment mount portion and configured to hold a wheel of said bicycle.

16. The bicycle rack of claim 13, wherein said upwardly extending member is connected at said first end to said extension beam.

17. The bicycle rack of claim 14, wherein said upwardly extending member comprises an inner telescoping member and an outer telescoping member configured to receive said inner telescoping member and wherein said inner telescoping member can be adjusted within said outer telescoping member so that the length of said upwardly extending member can be adjusted.

18. The bicycle rack of claim 13, wherein said upwardly extending member is pivotally attached to said attachment mount portion and is configured to be movable between a first vertical position for holding said bicycle and a second horizontal position for being stored when not in use.

19. The bicycle rack of claim 16, wherein said upwardly extending member is pivotally attached to said extension beam and is configured to be movable between a first vertical position for holding said bicycle and a second horizontal position for being stored when not in use.

20. The bicycle rack of claim 14, wherein said seat anchoring assembly includes a closeable jaws assembly which comprises a first jaw member and a second jaw member, and wherein said first and second jaw members can be moved relative to each other.

21. The bicycle rack of claim 20, wherein said closable jaws assembly is rotationally mounted to said upwardly extending member.

22. The bicycle rack of claim 14, wherein said seat anchoring assembly is configured to hold the seat post of a bicycle.

23. The bicycle rack of claim 13, wherein said bicycle rack is configured to hold more than one bicycle.

* * * * *